United States Patent [19]

Sutherland

[11] 3,866,245
[45] Feb. 18, 1975

[54] PLASTIC GLOVES AND METHOD OF MAKING SAME

[76] Inventor: Donald Robinson Sutherland, 315 Forman Ave., Toronto, Ontario, Canada

[22] Filed: Dec. 22, 1972

[21] Appl. No.: 317,826

[52] U.S. Cl. .................... 2/169, 156/515, 156/251, 2/159, 2/167
[51] Int. Cl. ...................... B32b 31/18, A41d 19/00
[58] Field of Search ........ 156/251, 515; 2/158, 159, 2/167, 161 R, 163, 164, 169; 223/78

[56] References Cited
UNITED STATES PATENTS

| | | | |
|---|---|---|---|
| 2,096,412 | 10/1937 | Sturm | 2/161 R |
| 2,526,634 | 10/1950 | Chauannes | 2/167 X |
| 2,689,812 | 9/1954 | Mollica et al. | 156/251 |
| 2,782,421 | 2/1957 | Winson | 2/158 |
| 3,028,576 | 4/1962 | Gerard | 156/251 |
| 3,098,237 | 7/1963 | Slimovitz | 2/164 |
| 3,106,502 | 10/1963 | Starger et al. | 156/251 |
| 3,114,915 | 12/1963 | Gross | 2/158 |
| 3,147,493 | 9/1964 | Winson | 2/158 |
| 3,191,187 | 6/1965 | Comer et al. | 2/167 |
| 3,225,360 | 12/1965 | Keilen, Jr. et al. | 2/167 |
| 3,329,548 | 7/1967 | Blatz | 156/251 |
| 3,625,790 | 12/1971 | Ayres | 156/251 |

Primary Examiner—Charles E. Van Horn
Assistant Examiner—M. G. Wityshyn
Attorney, Agent, or Firm—Fetherstonhaugh & Co.

[57] ABSTRACT

A plastic glove and a method of making same wherein a preformed liner is located between two plastic films which are subsequently sealed along the seal line disposed outwardly from the liner to the required contour of the side edges of the glove.

11 Claims, 8 Drawing Figures

PLASTIC GLOVES AND METHOD OF MAKING SAME

FIELD OF INVENTION

This invention relates to the manufacture of plastic gloves. In particular this invention relates to the manufacture of the plastic gloves in which a liner is introduced to facilitate the fitting and removal of the glove.

PRIOR ART

Polyethylene gloves are widely used where disposable gloves are required because of their economy, their inertness to a wide range of chemicals and their flexibility over a wide range of temperatures. In light gauges, around one mil, they provide excellent touch sensitivity. With the heat sealed seams intact, they are waterproof, have adequate grease and oil resistance for gloves, and they are impervious to most common, water-based chemical cleaning solutions. Where special protection is needed, other thermoplastic films, such as polyamides or polypropylenes are available.

Whatever film is used, this type of glove owes much of its economy to the fact that the seams are heat sealed rather than sewn, as in a conventional cloth or leather glove. A common way of making disposable plastic gloves is to fold a film double as it is drawn off the roll, with the line of the fold in the machine direction, then to pass the double layer of plastic into a reciprocating heat seal and cut out die, where the glove seams are made and the glove is cut out, all in one single, rapid motion. Given the economy of heat sealing compared to other methods of making seams, it is virtually mandatory that disposable gloves be made by heat sealing.

The greatest single disadvantage of this type of glove is its tendency to stick to the skin when even a small amount of perspiration is present. Since a majority of the jobs where the gloves are used require some physical exertion, perspiration is usually inevitable. Moreover, the moisture barrier properties of the plastic ensures that any perspiration generated does not dry off readily. The end result is that the glove is stuck to the hand, and is so difficult to remove that it is often torn in the removal process. This characteristic of the glove is so irritating that it severely limits the saleability of these gloves.

Various means are used to try to alleviate this problem. Gloves are commonly dusted with starch or talc powder to improve their slip. Also, gloves are made deliberatley large to make them easier to put on and take off. Neither of these methods is completely satisfactory. The dusting method fails because it is very hard to apply a large enough amount of dust uniformly over the film. In addition, large amounts of dust interfere with the heat seals. The inherent sloppiness of the oversize glove is a sufficient drawback to make this approach unattractive.

I have discovered that if a die cut, glove shaped layer of paper is adhered to the heat sealable film in such a position that permits heat seals to be made just beyond the edge of the paper, a glove can be made that has greatly reduced tendency to stick to the hand. The glove retains the properties of the allplastic glove in that it remains light, waterproof and economical, and the main disadvantage of the all-plastic glove is virtually eliminated.

While glove liners have long been a part of the glove industry a conventional sewn liner would be prohibitively expensive in this application. Similarly, while paper coated with plastics is readily available commercially, and it will not stick to the skin when the paper side faces the skin, it would not be practical for disposable glove manufacture because it is not heat sealable with the paper on the inside.

Many combinations of plastic outer material and liner material can be used, as long as the heat seal area is kept clear of liner material. Examples of plastic outer layers would be polyethylene, polypropylene, polybutylene, polyamides, ethylene/vinyl-acetate copolymer, polyvinyl chloride, polyvinylidine chloride, and many others. Various films could be combined to provide two or more layers for special purposes; for example, a high coefficient of friction material such as ethylene/vinylacetate copolymer film could be bonded to polyethylene film to give a special purpose glove material. Also films made from blends of different resins, or films of copolymers of different resins would be advantageous for certain applications.

The material for the liner can be equally varied. For maximum disposability, a low cost tissue would be acceptable. Where a greater measure of re-useability was required, a wet strenth towelling paper would be more practical. When the end use justifies it, cloth, or non-woven fabric could be used.

Where very good touch sensitivity was required, the liner can be cut back from the finger tip area without detracting seriously from the ability to remove the glove.

The liner material can be adhered to the plastic film by any convenient means. It can be glued, or it can be heat sealed, or it can be extrusion laminated to the film, or, with special equipment, the film can be extrusion coated directly onto the die cut liner. The glue and the heat seal method can cover the whole area of the liner, or adhesion can be limited to a pattern of spots or lines sufficient to hold the liner in place during glove manufacture and use. In this context, heat seals would include seals made with ultra sonic equipment. It would also include heat sealing of primed or coated liner material to the film.

Where applicable, the liner, or the outer plastic film can be printed or coloured.

Mitts can be made by this method if it is desirable to do so. also, a long sleeve can be extended from the cuff to provide arm protection.

SUMMARY

According to an embodiment of the present invention, there is provided in a method of making a plastic glove from overlapping films of thermoplastic material wherein the glove is formed by heat sealing the overlapping films of thermoplastic material along a predetermined seal line having the outline of the required glove, the improvement comprising the step of interposing a liner which has been precut to an undersize fit with respect to the contour of said seal line, between said overlapping films before heat sealing whereby the liner is spaced inwardly from the seal line and does not prevent sealing.

According to a further embodiment of the present invention, there is provided an improved plastic glove comprising two films of thin thermoplastic material bonded to one another along a seal line conforming generally to the required finger and hand outline of the required glove and a liner consisting of two separate webs of a liner material arranged one above the other and each having side edges conforming generally to the contour of and spaced inwardly from said seal line, the side edges of one liner being spaced apart from the side edges of the other liner.

According to a still further embodiment of the invention, the liners are made from paper, woven fabric or non-woven fabric.

PREFERRED EMBODIMENT

The invention will be more clearly understood after reference to the following detailed specification read in conjunction with the drawings, wherein FIG. 1 is a plan view of a glove according to an embodiment of the present invention;

Figures 1, 3:
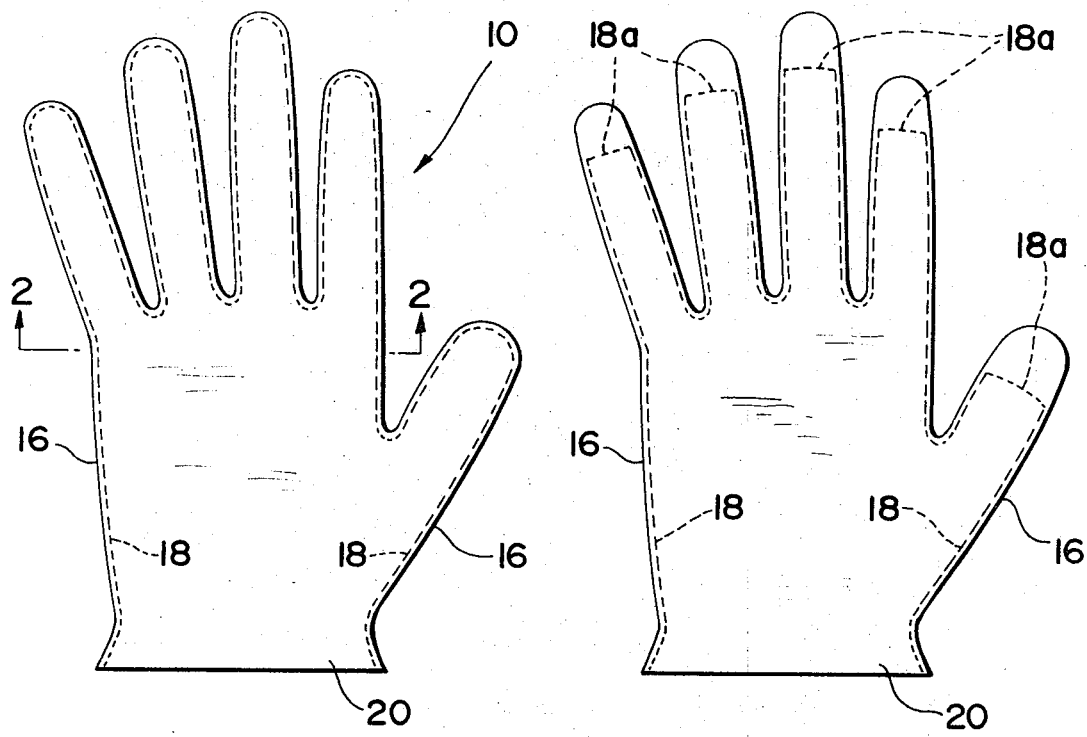
FIG. 3 is a plan view of an alternative form of glove.
Figure 2:
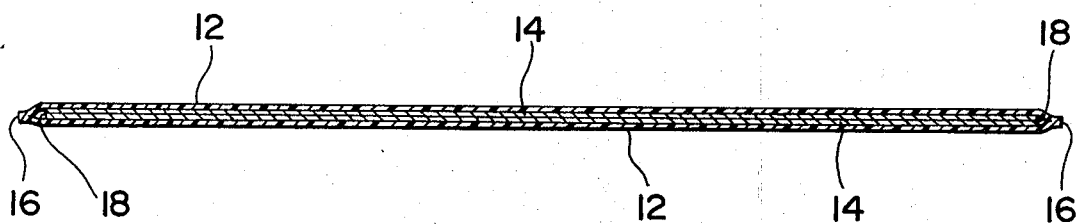
FIG. 2 is a cross-sectional view taken along the line 2—2 of FIG. 1.

With reference to FIGS. 1 and 2 of the drawings, it will be seen that a glove according to an embodiment of the present invention is generally identified by the reference numberal 10 and consists of two thermoplastic films 12 and two liner webs 14. The films 12 are heat sealed along seam line 16 which extends continuously about the periphery of the side edge of the glove. The side edges 18 of the liner webs 14 are spaced inwardly from the seal line 16 and contoured to extend substantially parallel to the seam line 16 in a spaced relationship therewith.

The glove illustrated in FIG. 3 of the drawings differs from that illustrated in FIG. 1 in that the portions of the liner webs which extend into the finger cavities terminate at edges 18a spaced inwardly from the fingertip covering area of the glove so that when the glove is worn, the liners will not extend over the fingertips of the wearer. This has the effect of increasing the touch sensitivity.

It will be noted that in both embodiments of the glove the seal line 16 does not extend across the cuff portion 20 so that the glove has an open end opening in from the cuff portion 20.

Preferably, the liners 14 are secured to their adjacent film 12 so that when the glove is opened the passage which is provided is the passage formed between the two liners 14. It will be noted that by making the liners an undersize fit with respect to the seal line, it is possible to position the liners 14 between the films 12 before forming the seal. The fact that the liners are undersize permits the films 12 to be placed in intimate contact with one another to effect heat sealing.

Figure 4:
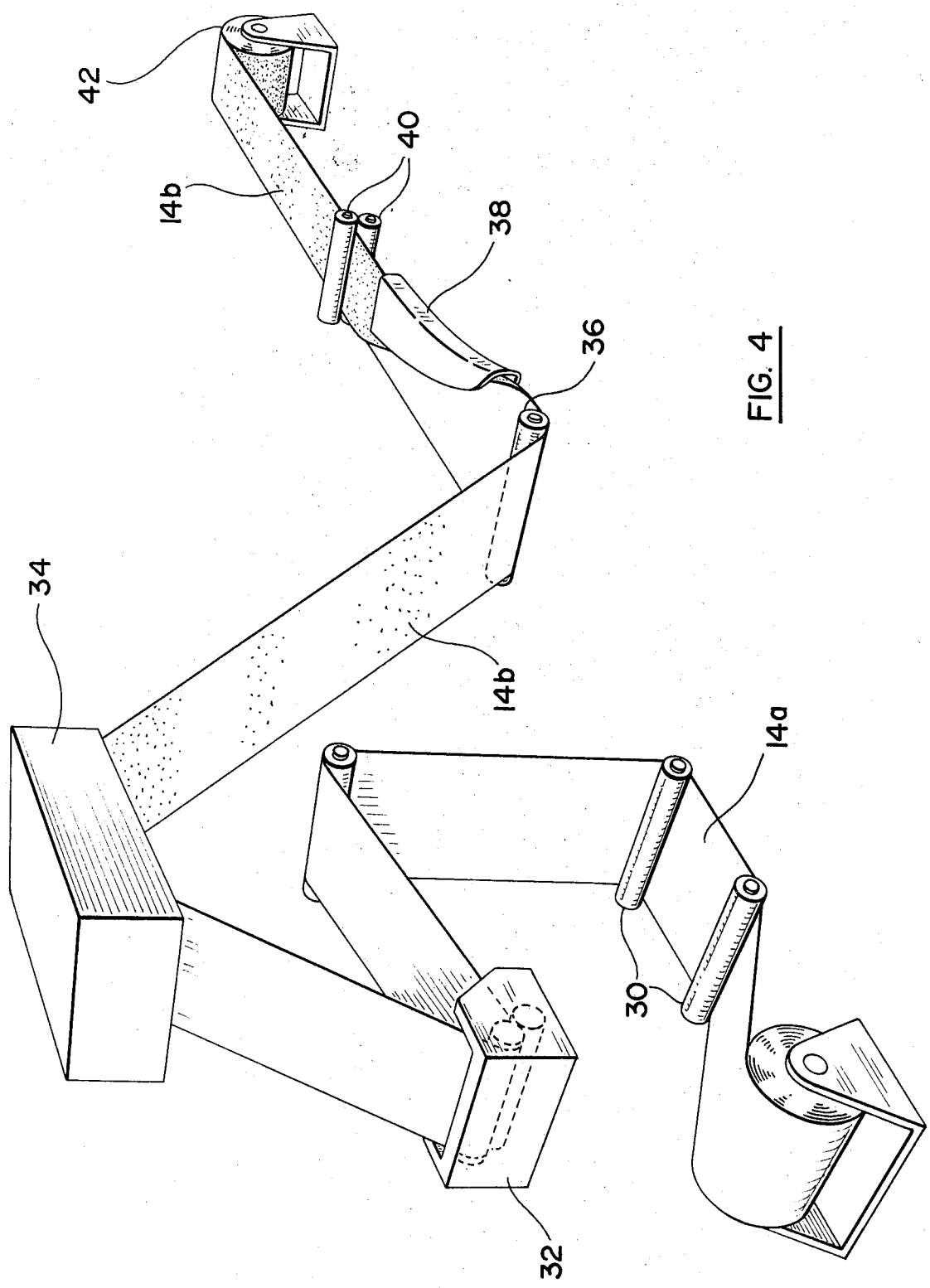
FIG. 4 is a diagrammatic view of an apparatus for use in the initial stages of the preparation of the liner material.
Figure 5:
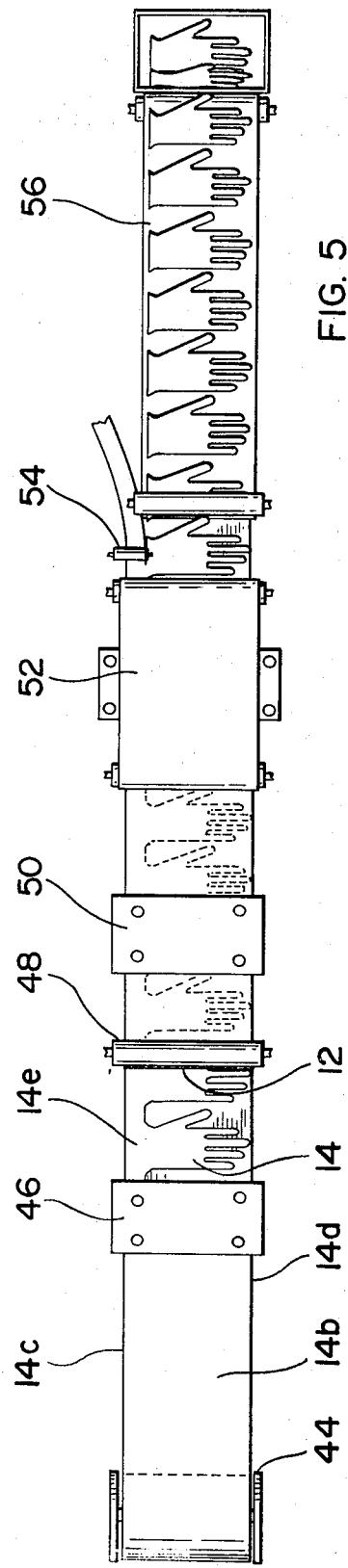
FIG. 5 is a diagrammatic plan view of an apparatus for manufacturing a glove according to the present invention.
Figure 6:
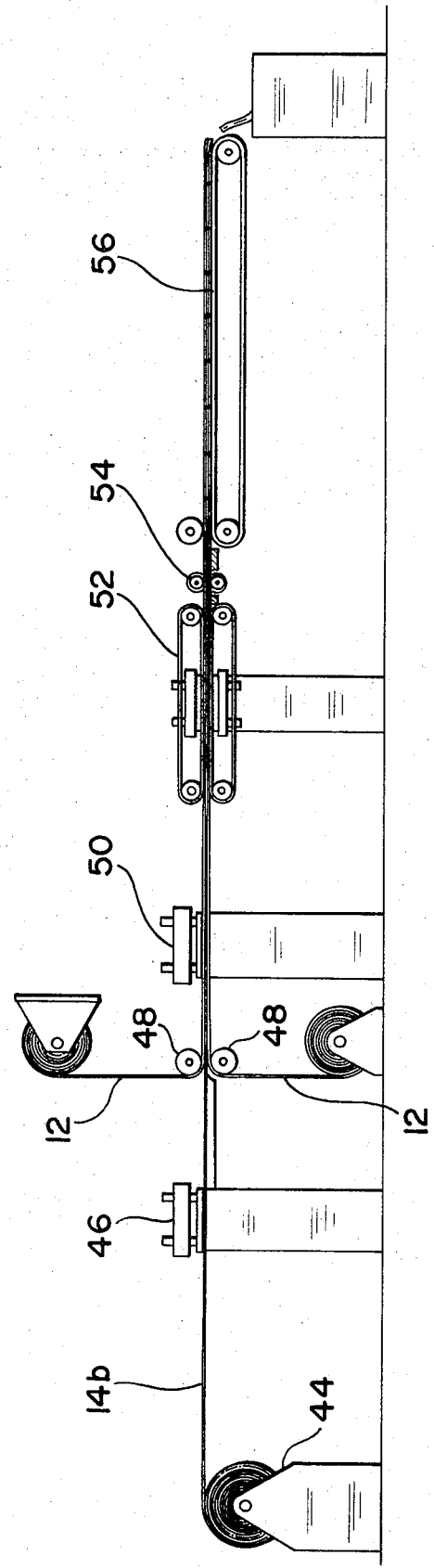
FIG. 6 is a diagrammatic side view of the apparatus of FIG. 5.

One method of manufacturing the glove according to the present invention is illustrated in FIGS. 4 to 6 inclusive.

FIG. 4 of the drawings diagrammatically illustrates a method and apparatus for preparing the liner material prior to its insertion between the films. As previously indicated, there is a substantial advantage to securing the liners to an adjacent film and the apparatus illustrated in FIG. 4 may be used for this purpose. In the apparatus illustrated in FIG. 4, a continuous web 14a of a material suitable for use in the manufacture of the liner is guided through a series of guide rollers 30 and through a gravure applicator device 32 wherein a heat sealable primer is applied to one surface of the web 14a. The web 14a passes through a dryer 34 wherein the primer is dried and exits to roller 36. The web 14a with the primer coating applied to the surface 14b passes to a folding bar 38, which is diagrammatically illustrated in FIG. 4, over which it is folded upon itself in a configuration wherein the primer coated surfaces 14b are outwardly disposed. The web then passes through driven rollers 40 and is then wound onto a coil on winding drum 42.

FIGS. 5 and 6 serve to illustrate the method and apparatus used to form the glove and to position the liner. The folded web 14b is unwound from an uncoiling device 44. The folded web 14b has a folded edge 14c and open edge 14d. The folded web 14b passes to a die cutting device which may be any of the well known types used for cutting paper, fabric and the like. The web 14b is cut in the die cutting device to form a pair of liners 14 connected by a marginal edge portion 14e which extends inwardly from the folded edge 14c. The marginal edge portion 14e serves to positively locate the die cut liner portions at predetermined intervals along the length of the web and by forming the marginal edge portion 14e at the folded edge 14c, the marginal edge portions also serve to retain one liner element of a pair of liner elements relative to one another for subsequent processing.

The precut liner web 14b passes from the die 46 between a pair of rollers 48 which also receive the plastic film 12. The laminate formed by the films 12 and the liner 14 then passes to a seam heat sealing device 50 which operates to seal the plastic films to one another along seal line 16 and to simultaneously detach the portions of the plastic web which extend outwardly from the seam line 16, while retaining the portion of the plastic which extends in an overlying relationship with respect to the marginal edge portion 14e of the liner. Again by retaining the marginal edge portion, it is possible to feed the preformed gloves through the subsequent stages of the operation in a predetermined spaced relationship. The laminate formed by the liner and the plastic film and sealed to the required outline of the glove then passes to a further heating device 52 which serves to activate the primer applied to the liner so that the liners are bonded to their adjacent plastic film. The gloves connected by the marginal edge portion 14e are then passed to a slitting device 54 in which the marginal edge portion 14e is removed and the individual gloves are discharged onto a conveyor 56 for subsequent packaging and shipping.

Various modifications of the present invention will be apparent to those skilled in the art without departing from the scope of the invention. For example, rather than pretreating the liner material with a primer to achieve the bond between the liner and the film a simple form of adhesive applicator may be introduced just prior to the pinch rollers 48 for applying adhesive to the outer surface of the liner. The liner may be secured to the film over the entire surface of the liner or at preselected spots so as to ensure that when the glove is opened, the liner will be retained with respect to its adjacent film so as to facilitate the action of putting the glove on and removing the glove. When gloves according to the present invention are made from a thin plastic material such as polyethylene, polypropylene, polybutylene, polyamides, ethylene vinyl-acetate copolymer, polyvinyl chloride, polyvinylidine chloride and the like having a thickness of about 1 mil, it has been found that a tissue paper liner serves to greatly facilitate the fitting and removal of these gloves. The liner may also be made from towelling paper or a cloth material such as a woven or non-woven fabric depending upon the particular use. It has been found, however, that the relatively inexpensive papers, such as tissue paper and towelling paper, are particularly suitable for use in these thin gloves in view of the cost factors involved and the fact that gloves of this type are generally disposable and are only worn once. It will be understood that a glove such as a mitt may also be manufactured by the method of the present invention.

Whereas the apparatus of the present invention described in FIGS. 5 and 6 of the drawings is intended to operate on an intermittent feeding cycle, it will be apparent that the apparatus may be modified to run continuously at high speed while achieving the required sheering and sealing operations by the application of known techniques.

Figure 8:
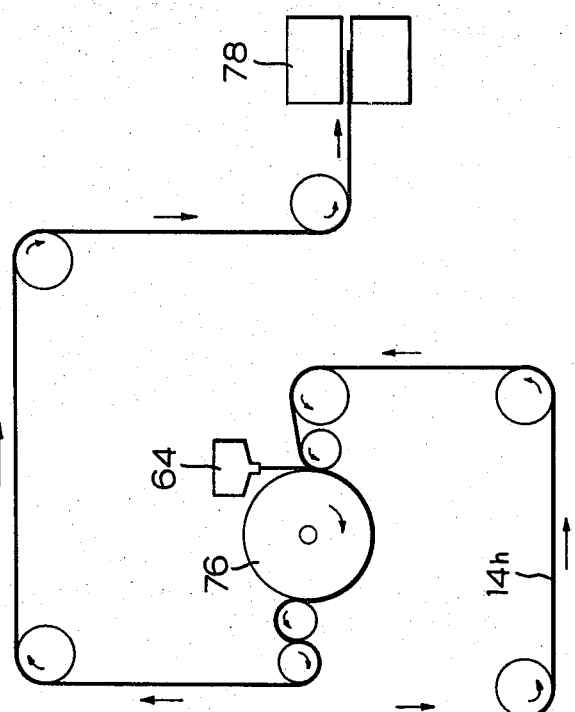
FIG. 8 is a plan view of an alternative form of liner.
Figure 7:
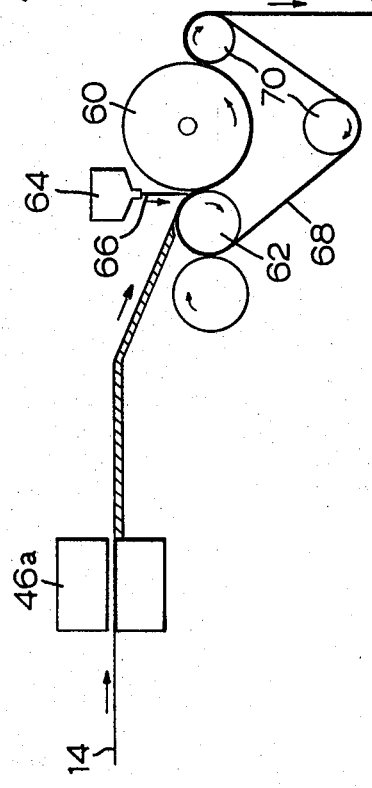
FIG. 7 is a diagrammatic view of an alternative form of apparatus and method of production.

A further embodiment of the method of the present invention is illustrated in FIGS. 7 and 8 of the drawings.

FIG. 8 of the drawings illustrates a plan view of a liner 14f arranged with a central portion 14g connecting a plurality of pre-cut liner elements 14h formed to the required contour previously described and connected at their inner or cuff ends to the portion 14g. The web 14f which is in two layers arranged one on top of the other passes between dies 46a wherein it is formed to the contour shown in FIGS. 5 or 8. The web thereafter passes between the nip of a chill roller 60 and roller 62. An extruder die 64 is located above the nip of the rollers 60 and 62 so as to extrude a layer 66 of a plastic material directly into the nip of the rollers. The plastic material 66 will adhere to one surface of the web 14f. A continuous belt 68 extends around the chill roller 60 and the roller 62 and 70 to support the web 14f and the layer of plastic material 66 in an arc of contact with the chill roller sufficient to enable the plastic material to chill before discharge from the chill roller 60. Preferably the belt 68 is made from "Teflon" (trade mark) or the like so as to permit the plastic material 66 to be stripped therefrom after chilling without difficulty. The web 14h with one layer of plastic attached thereto so as to extend outwardly from the edges of the liner in the manner of the laminated films of FIGS. 5 and 6 of the drawing then passes through a second extrusion device wherein a second extruder 64 applies a layer of plastic material to the opposite side of the web 14 so as to extend over the web 14 and outwardly therefrom. The plastic material discharged from the second extruder 64 will become bonded to the plastic material applied in the first extrusion operation outwardly from the side edges of the web 14 so as to form a seam line connecting each layer outwardly from the side edges of the liner. The chill roll 76 again serves to chill the extruded plastic and the composite liner with the plastic thereon passes to a die cutting device 78 wherein the glove with the liner therein is severed from the continuous web in a blanking operation.

These and other modifications of the present invention will be apparent to those skilled in the art.

From the foregoing it will be apparent that the present invention provides a simple and inexpensive method of producing an inexpensive thin plastic glove which is lined to permit it to be fitted and removed with ease.

It will be understood that whereas in the aforegoing disclosure reference has been made to plastic gloves made from plastic films having a thickness of about 1 mil, the same method and apparatus may be used in the production of gloves wherein the plastic material is of a thickness less than 1 mil or considerably more than 1 mil. It is believed that the majority of gloves will have a plastic film thickness in the range up to about 15 mil.

What I claim as my invention is:

1. A method of manufacturing a glove comprising the steps of
   a. forming a two-ply liner web consisting of a two-ply longitudinally extending portion and a plurality of two-ply hand shaped portions, each of said hand shaped portions having distinct finger portions and a cuff portion, each of said cuff portions being integrally connected to a ply of said longitudinally extending portion such that said hand portions project laterally from said longitudinally extending portions at spaced intervals along the length thereof,
   b. interposing said two-ply liner web between overlapping films of thermoplastic material and bonding said overlapping films of thermoplastic material to one another along a seal line disposed outwardly from the edges of said hand shaped portion to form a laminate, and
   c. detaching individual lined gloves from the remainder of said laminate by severing said films along a line spaced outwardly from said seal line and by severing said hand shaped portions of said liner from the longitudinally extending portion thereof along a line extending across said cuff portion.

2. A method as claimed in claim 1 wherein said liner plies are bonded to their adjacent plastic film.

3. A method as claimed in claim 1 wherein each of said thermoplastic films has a thickness up to about 15 mil.

4. A method as claimed in claim 1 wherein said finger portions of said liner web terminate inwardly from the fingertip portions of said glove whereby said fingertip portions of the glove are unlined to provide touch sensitivity.

5. A method as claimed in claim 4 wherein said liner plies are bonded to their adjacent plastic film.

6. A method as claimed in claim 1 wherein the liner web is formed from paper.

7. A method as claimed in claim 6 wherein the paper is selected from the group consisting of tissue paper and wet strength toweling paper.

8. A method as claimed in claim 1 wherein a plurality of liners are integrally connected to one another when initially interposed between said overlapping films and disconnected from one another subsequent to said heat sealing of said films.

9. A method as claimed in claim 1 wherein each of said sheets of thermoplastic material are formed by extrusion directly on to said liner.

10. A method as claimed in claim 1 wherein said two-ply liner web is obtained by folding a unitary web upon itself along a longitudinally extending fold line.

11. A method as claimed in claim 10 wherein said longitudinally extending portion of said liner web extends inwardly from said longitudinally extending fold line whereby said plies are integrally connected at said fold line to retain the hand shaped portions of the plies in alignment with one another prior to the application of said films.

* * * * *